(12) United States Patent
Ortego et al.

(10) Patent No.: US 9,144,228 B1
(45) Date of Patent: Sep. 29, 2015

(54) MATURE MODULAR REEF

(71) Applicant: ORA TECHNOLOGIES, LLC, Opelousas, LA (US)

(72) Inventors: Tyler R Ortego, Metairie, LA (US); Matthew D. Campbell, Austin, TX (US)

(73) Assignee: ORA TECHNOLOGIES, LLC, Opelousas, LA (US)

(*) Notice: Subject to any disclaimer, the term of this patent is extended or adjusted under 35 U.S.C. 154(b) by 8 days.

(21) Appl. No.: 14/222,954

(22) Filed: Mar. 24, 2014

(51) Int. Cl.
*A01K 61/00* (2006.01)
*E02B 3/04* (2006.01)

(52) U.S. Cl.
CPC ............... *A01K 61/002* (2013.01); *E02B 3/046* (2013.01)

(58) Field of Classification Search
CPC .... E02B 3/046; A01K 61/006; A01K 61/002; A01K 61/025; A01K 63/006
USPC ............... 119/234, 237, 238, 239, 240, 241; 405/25, 30, 33
See application file for complete search history.

(56) References Cited

U.S. PATENT DOCUMENTS

| | | | | |
|---|---|---|---|---|
| 4,231,322 A * | 11/1980 | Gilpatric | ............ | 119/237 |
| 4,316,431 A * | 2/1982 | Kimura | ............ | 119/221 |
| 4,840,516 A * | 6/1989 | Rambo | ............ | 405/33 |
| 4,997,311 A * | 3/1991 | Van Doren | ............ | 405/30 |
| 5,071,285 A * | 12/1991 | Van Doren | ............ | 405/25 |
| 5,113,792 A * | 5/1992 | Jones et al. | ............ | 119/221 |
| 5,199,377 A * | 4/1993 | Gehrmann et al. | ............ | 119/237 |
| 5,259,695 A * | 11/1993 | Mostkoff | ............ | 405/29 |
| 5,269,254 A * | 12/1993 | Gagliano et al. | ............ | 119/237 |
| 5,507,594 A * | 4/1996 | Speicher | ............ | 405/25 |
| 5,564,369 A * | 10/1996 | Barber et al. | ............ | 119/221 |
| 5,579,724 A * | 12/1996 | Chauvin | ............ | 119/237 |
| 5,803,660 A * | 9/1998 | Warren et al. | ............ | 405/25 |
| 5,908,265 A * | 6/1999 | Mostkoff | ............ | 405/29 |
| 6,431,792 B1 * | 8/2002 | Barnes | ............ | 405/25 |
| 6,467,993 B1 * | 10/2002 | Utter et al. | ............ | 405/24 |
| 7,798,102 B2 * | 9/2010 | Mouzakitis et al. | ............ | 119/200 |
| 8,312,843 B2 * | 11/2012 | Ortego et al. | ............ | 119/237 |
| 8,550,033 B2 * | 10/2013 | Matthews et al. | ............ | 119/236 |
| 2002/0119006 A1 * | 8/2002 | Moore | ............ | 405/33 |
| 2006/0275081 A1 * | 12/2006 | Medina Folgado et al. | .... | 405/15 |
| 2009/0297270 A1 * | 12/2009 | Black et al. | ............ | 405/35 |

* cited by examiner

*Primary Examiner* — Yvonne Abbott-Lewis
(74) *Attorney, Agent, or Firm* — John B. Edel; Edel Patents LLC

(57) ABSTRACT

Methods of reef construction are disclosed that include exposing a man-made scaffold to environmental conditions such that bivalve organisms grow on the man-made scaffold for a duration sufficient to create a scaffold having two generations of bivalve attachment. Certain methods involve moving the biologically accreted scaffold to a second location to serve as a reef or breakwater after substantial growth of bivalve organisms has occurred.

22 Claims, 3 Drawing Sheets

MATURE MODULAR REEF

Modular reefs disclosed herein may be used in the construction of man-made reefs including reefs used for coastal protection and to assemble breakwater structures. Certain modular reefs disclosed herein have multiple generations of bivalve organisms.

The methods described herein may, for example, comprise preparing a scaffold comprising an exposed hard calcium containing material; exposing the scaffold to a first set of conditions in which a first group of bivalve organisms attach to the scaffold; allowing the first group of bivalve organisms to grow to sexual maturity such that a group of sexually mature bivalve organisms is present on the scaffold; and moving the scaffold and the group of sexually mature bivalve organisms from a first location having a first fetch to a second location having a second fetch; wherein the second location has a feature selected from: a second fetch that is at least 50% longer than the first fetch and a second location that is higher than the first location by an elevation change that is greater than 20% of a distance equivalent to a mean range of tide at the second location; wherein upon moving the scaffold and the group of sexually mature bivalve organisms to the second location a first fraction of the group of sexually mature bivalve organisms are located above mean low water for the second location.

The methods described herein may, for example, comprise exposing a man-made scaffold to a first environment such that bivalve organisms grow on the man-made scaffold for a duration sufficient to create a biologically accreted scaffold having two generations of bivalve attachment; and moving the biologically accreted scaffold to a second location; wherein the first environment is a first marine environment; wherein the second location is in a second marine environment; wherein a biologically accreted component of the biologically accreted scaffold makes up at least 30% of a total weight of the biologically accreted scaffold.

DETAILED DESCRIPTION

Example 1

Initial Geometry

Figure 1:
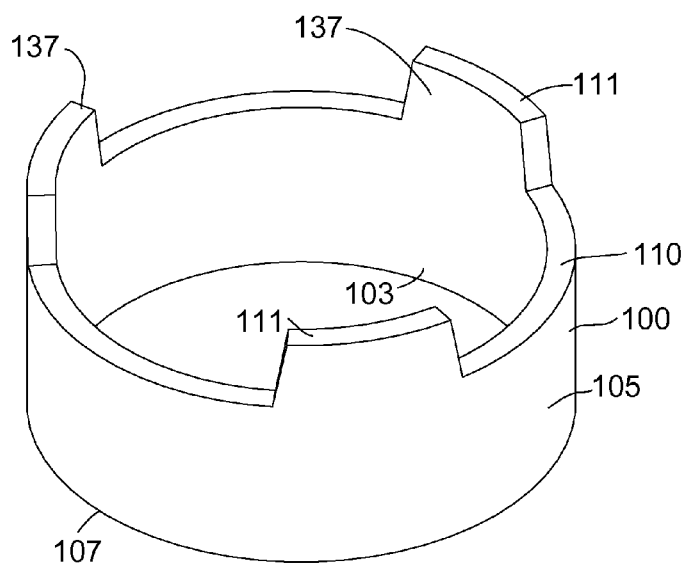
FIG. 1 shows a perspective view Concrete cylinder 100 displayed upside down.
Figure 2:
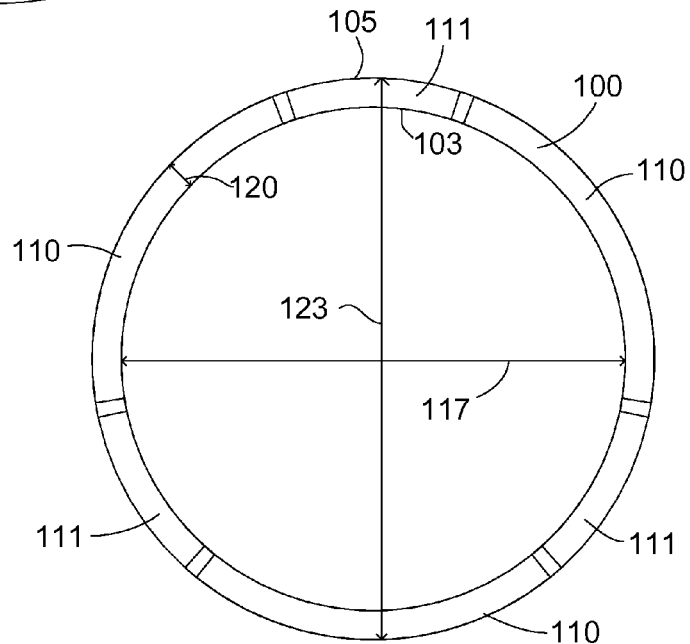
FIG. 2 shows a bottom view of Concrete cylinder 100.
Figure 3:
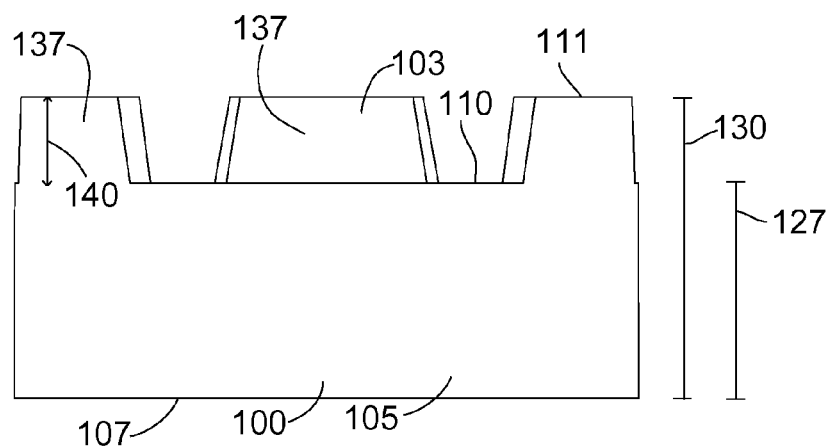
FIG. 3 shows a front view of Concrete cylinder 100 displayed upside down.

Referring now to FIGS. 1, 2, and 3 of the drawings, Concrete cylinder 100 is shown upside down as compared to a typical installation orientation to better display Cylinder feet 137. Cylinder feet 137 serve as an extension of Concrete cylinder 100 which may better secure Concrete cylinder 100 to subsurface terrain and which may aid in the securing of Concrete cylinder 100 within a formation of similar cylinders in configurations that may for example create a breakwater. Concrete cylinder 100 has a Concrete cylinder inner surface 103, a Concrete cylinder outer surface 105, a Concrete cylinder upper surface, Concrete cylinder foot base surface 111, and a Concrete cylinder base surface 110. Concrete cylinder 100 may for example have a Concrete cylinder outer diameter 123 of 58 inches, a Concrete cylinder inner surface diameter 117 of 46 inches, a Concrete cylinder thickness 120 of 6 inches, a Total concrete cylinder height 130 of 32 inches, a Continuous concrete cylinder height 127 of 24 inches, and a Cylinder foot height 140 of 8 inches. In separate but related embodiments Concrete cylinder thickness 120 may be 4 inches or Concrete cylinder thickness 120 may be 2 inches. Concrete cylinder 100 as depicted in FIGS. 1, 2, and 3 of the drawings may be considered to be an example of an accretion scaffold on which biologic deposits may accumulate. As that phrase is used herein, "scaffold" indicates a structure suitable for the growth of bivalve organisms and other organisms in a marine environment. The form of that growth may, for example, be primarily composed of bivalve organisms such as oysters.

Example 2

Initial Composition

The composition of Concrete cylinder 100 may for example be Portland cement with or without structural reinforcement such as rebar.

In another embodiment, the cement contains either seeds or legumes such as peanuts with the seeds or legumes comprising >1% nitrogen, >0% fat, and <10% sugar by weight. The cement would promote aquatic organism growth by way of metabolism of the organic material by bacteria when exposed to aquatic conditions. At least one binder material in the cement may be a slowly biodegradable adhesive. The slowly biodegradable adhesive may be selected from the group consisting of: a cornstarch polymer, animal-based protein glues, artificial (organic) biodegradable polymers, and mixtures thereof. The at least one organic material may consists essentially of cottonseed.

Example 3

Construction

Accretion scaffolds as described herein and as used with the methods described herein may take a large variety of forms. The accretion scaffolds will generally contain a substantial quantity of hard calcium rich material which may serve as a substrate for the accumulation of bivalve organisms. Portland cement, Portland cement modified with organic additives described above, other cements, limestone, and shell materials are among the hard calcium rich materials which may be present in the accretion scaffolds. The accretion scaffold may have a frame made up of rigid or resilient material such as wood, plastic, rebar, or heavy wire. The accretion scaffold may take the form of bars, beams, cylinders, or frames that include one or more polygon shapes. The framing materials may be materials that would degrade or be destroyed by the marine environment that they are placed in. The framing materials may be coated with cement by way of dipping, applying with a brush, putty knife, trowel or other comparable means. The framing materials may also be wrapped with a mesh, rope, net or other material that has been dipped in a mortar, cement, or other solidifying mix. Similarly, the mesh, rope, net or other material may be covered with a mortar, cement, or other solidifying mix by brush, putty knife, trowel or other comparable means either before or after fastening to the framing materials. The wrapping materials may be fastened to the framing materials with wire, cable tie, staples or other securing means. The timing of the application of the cement type material is not critical to the assembly of the accretion scaffold, and various methods that produce an assembled accretion scaffold with a substantial surface area covered with hard calcium rich material could be used in a manner consistent with the embodiments described herein.

Figure 4:
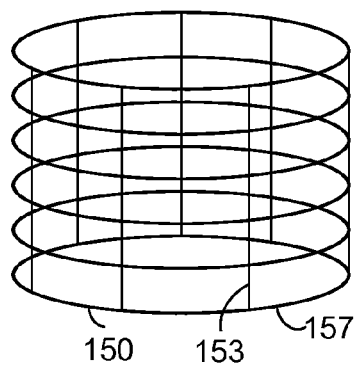
FIG. 4 shows a perspective view of an accretion scaffold.

Referring now to FIG. 4 of the drawings, which depicts one form of an accretion scaffold, Cylindrical frame 150 may be constructed from wire such as wire that may be used in various fencing applications having Cylindrical frame vertical members 153 and Cylindrical frame horizontal members 157. Wet cement or mortar may be applied to the Cylindrical frame horizontal members 157 and the Cylindrical frame vertical members 153 such that a substantial portion of the frame is coated with cement or mortar.

Figure 5:
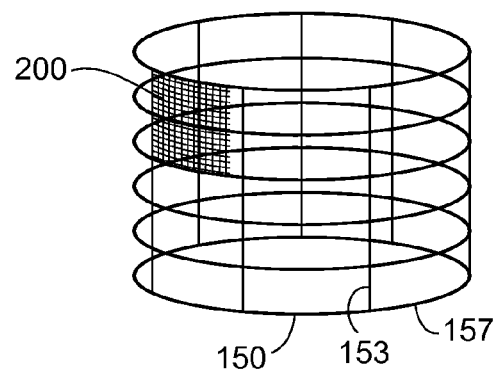
FIG. 5 shows a perspective view of another accretion scaffold.

Referring now to FIG. 5 of the drawings, which depicts another form of an accretion scaffold, the frame of the accretion scaffold made up of Cylindrical frame horizontal members 157 and Cylindrical frame vertical members 153 may be covered with a Net material 200 such that Net material 200 substantially envelops the wireframe of Cylindrical frame 150. Prior to the application of Net material 200 to Cylindrical frame horizontal members 157 and Cylindrical frame vertical members 153 Net material 200 may be dipped in wet cement or mortar. After the dipping of Net material 200 in the wet cement or mortar Net material 200 would be fastened by wire, clip, cable tie, or other equivalent means to the frame of the accretion scaffold. The entire structure would then be allowed to dry prior to deployment at an initial location consistent with the methods described herein.

Figure 6:
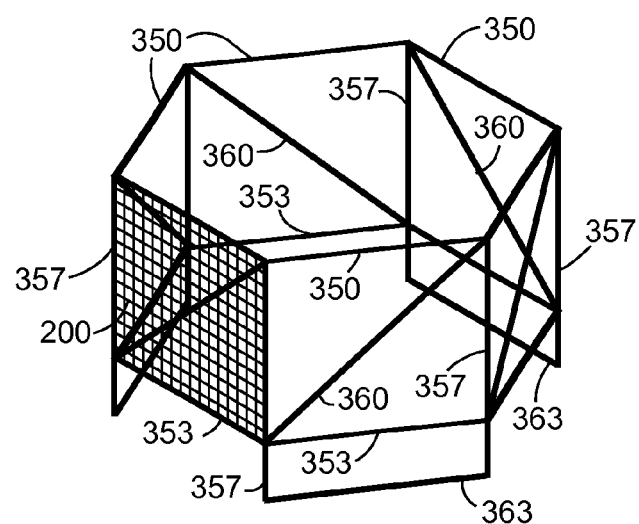
FIG. 6 shows a perspective view of another accretion scaffold.

Referring now to FIG. 6 of the drawings, which depicts another form of an accretion scaffold, the frame of the accretion scaffold may be made up of Upper framing members 350, Lower framing members 353, Vertical framing members 357, and Cross bracing framing members 360. As depicted in FIG. 6 the collection of Upper framing members 350 form a hexagon and the collection of Lower framing members 353 form a hexagon. Optionally, Vertical framing members 357 may extend below Lower framing members 353 such that the accretion scaffold may rest either directly on Vertical framing members 357 or on Foot framing members 363. Net material 200 and the associated mortar or cement may be placed over the accretion scaffold in a manner comparable to the manner described in the treatment of the embodiment depicted in FIG. 5 of the drawings such that Net material 200 envelops a substantial portion of the frame. Accretion scaffolds of this variety may be configured from a nearly limitless number of geometric configurations. Among the many geometric configurations contemplated are configurations in which the upper and lower framing members form polygons.

Example 4

Maturation Timing

One or more accretion scaffolds may be initially placed in a first location submerged in water. The location of the placement of the accretion scaffolds would be at a location in which oyster larvae are likely to be located in substantial quantity during the portion of the oyster reproductive cycle in which larvae are waterborne. The timing of that placement would be such that the surfaces of the accretion scaffolds would be exposed to a significant quantity of larvae during the portion of the oyster reproductive cycle in which larvae are waterborne. From the perspective of the accretion scaffold the exposure and subsequent attachment of spat during that time may be referred to as the first spat season. The period of growth of between the time that larvae are in the water during the first spat season and the subsequent spat season may be referred to as the first growth season. During the first growth season a population of seed oysters develop on the accretion scaffold. During the second spat season, which is one year after the first spat season, a second group of spat attach to the accretion scaffolds or to previously attached oysters such that during a second growth season which follows the second spat season the seed oysters mature to market size oysters or near market size oysters and the spat mature into seed oysters. During the third spat season which is two years after the first spat season, a third group of spat attach to the accretion scaffolds or to previously attached oysters such that at the beginning of the third growth season there would be a population of spat, seed oysters, and market size oysters all growing on the accretion scaffolds. This configuration would represent an accretion scaffold on which three generations of oyster growth are present. After the attachment of the third generation of spat the mass of the accretion scaffolds including the biologic accretion component may be twice or more than twice the mass of the original accretion scaffolds and may be regarded as a sexually mature generationally diverse modular reef.

The sexually mature generationally diverse modular reef may be removed from the first submerged location and placed at a second submerged location or intertidal location having a need for a breakwater structure. The sexually mature generationally diverse modular reef has a substantial advantage over other differently configured breakwater or reef structures because the sexually mature generationally diverse modular reef has an oyster population that is not only capable of producing spat in the first spat season following the placement as a breakwater, it would have a subsequent generation of oysters that are sexually mature and larvae producing during the second spat season following the placement of the breakwater and under appropriate conditions would have new generations of sexually mature and larvae producing oysters during each subsequent spat season.

Example 5

Maturation Timing

The preparation of generationally diverse modular reefs according to the disclosures herein may be practiced with oyster species in particular and with bivalve organisms more generally. The generational diversity of the bivalve organisms attached to the accretion scaffold as described herein may be measured by the calendar years in which spat bivalves attach to accretion scaffold either directly or indirectly by attaching to the existing biological accretion on the accretion scaffold. Accordingly, an accretion scaffold described as having two generations of bivalve attachment indicates that spat bivalves attached to accretion scaffold either directly or indirectly during two separate calendar years. The term calendar year as used herein refers to a period running from January 1 to December 31. In certain embodiments described herein, spat bivalves attach to an accretion scaffold during two or more calendar years. In certain other embodiments described herein, spat bivalves attach to an accretion scaffold during three or more calendar years.

Initial placement of the accretion scaffolds may be conducted in a manner that leaves an amount of space in between the accretion scaffolds such that the biologic accretion on the accretion scaffolds does not cause the accretion scaffolds to combine into a larger structure. In one example the initial spacing between the accretion scaffolds is greater than 6 inches. Initial placement of the accretion scaffolds may be on a sandy or muddy bottom such that attachment of the accretion scaffolds to the bottom is minimized. However, the accretion scaffolds described herein may be placed on alternate bottom terrains such as hard or rocky bottoms. In certain cases the biologically accreted scaffold may need to be forcefully separated from the bottom surface.

Example 6

Depth Maturation

As those phrases are used herein, the phrase "mean high water" indicates the average of all the high water heights observed over the National Tidal Datum Epoch for a particular location and "mean low water" indicates the average of all the low water heights observed over the National Tidal Datum Epoch for a particular location. For locations with shorter series of data or no data, comparison of simultaneous observations with a control tide station may be made in order to derive the equivalent datum of the National Tidal Datum Epoch. As that phrase is used herein, "mean range of tide" indicates the difference in height between mean high water and mean low water for a particular location. The usage of the phrases mean high water, mean low water, and mean range of tide should be interpreted in a manner consistent with the usage of those terms by the United States National Oceanic and Atmospheric Administration as of Mar. 18, 2014.

Unless otherwise specified all references to the location of scaffolds, accretion scaffolds, biologically accreted scaffolds and other similar devices with respect to height refers to the height of the uppermost extent of the scaffold, accretion scaffold, biologically accreted scaffold or other similar device. For example, if a scaffold is described as located above mean low water that description indicates that the uppermost extent of the scaffold is located above mean low water without regard to the height of other components of the scaffold.

The accretion scaffold is most susceptible to damage by waves upon the initial placement of the accretion scaffold and prior to growth of bivalve organisms on the accretion scaffold. In one embodiment, the accretion scaffold is placed at an initial location that is below mean low water. In that example, after bivalve attachment in two separate calendar years or three separate calendar years, the biologically accreted scaffold is moved to a location above mean low water.

In another related example, the accretion scaffold is placed at a first location. In that example, the accretion scaffold is allowed to accumulate two or three separate calendar years of bivalve attachment. After the two or three separate calendar years of bivalve attachment, the biologically accreted scaffold is placed at a second location having some degree of tidal impact. In that case, the placement of the biologically accreted scaffold at the second location may be such that the second location is higher than the first location by an elevation change that is greater than 20% of a distance equivalent to the mean range of tide at the second location. In a further related example, the placement of the biologically accreted scaffold at the second location may be such that the second location is higher than the first location by an elevation change that is greater than 40% of a distance equivalent to the mean range of tide at the second location. In a further related example, the placement of the biologically accreted scaffold at the second location may be such that the second location is higher than the first location by an elevation change that is greater than 80% of a distance equivalent to the mean range of tide at the second location. In a still further related example, the placement of the biologically accreted scaffold at the second location may be such that the second location is higher than the first location by an elevation change that is greater than 150% of a distance equivalent to the mean range of tide at the second location.

Example 7

Protection Maturation

The selection of a location for the initial placement of an accretion scaffold may be made based on one or more measures of how waves may impact the accretion scaffold and may in particular be selected such that the impact of waves on the accretion scaffold as initially placed is less than the impact of waves on the biologically accreted scaffold as subsequently placed. The accretion scaffold may be placed in an initial location for spat bivalve attachment prior to placement of the biologically accreted scaffold as a portion of a breakwater structure such that the initial location is at a location that would be considered to be better protected from waves than the location of the breakwater structure. In certain embodiments, the fetch of the initial location is less than one half of the fetch of the location of subsequent placement. In another embodiment, the fetch of the initial location is less than one fifth of the fetch of the location of the breakwater structure. In a still further related embodiment, the fetch of the initial location is less than one tenth of the fetch of the location of the breakwater structure. As used herein, the fetch represents the longest linear distance along which waves may accumulate to impact the relevant site.

In certain embodiments the initial placement of the accretion scaffold in a location for spat bivalve attachment is at a location that has a significant wave height of a 1 year return period event that is less than 2 feet. In certain related embodiments, the initial placement of the accretion scaffold in a location for spat bivalve attachment is at a location that has a significant wave height of a 1 year return period event that is less than 1.5 feet. As an example, the initial placement of the accretion scaffold in a location for spat bivalve attachment may be in a protected waterway that has a significant wave height of a 1 year return period event of 0.5 feet such that after a period of biologic accretion the placement of the biologically accreted scaffold is located as part of a breakwater structure in a location that has a significant wave height of a 1 year return period event of 4 feet. "Significant wave height" as that term is used herein designates the average of the highest one-third (33%) of waves, measured from trough to crest, that occur in a given period and should be interpreted in a manner consistent with the usage of that phrase by the United States National Oceanic and Atmospheric Administration as of Mar. 18, 2014.

In a related embodiment, the initial location for spat bivalve attachment has a significant wave height of a 1 year return period event that is less than ¼ of the significant wave height of a 1 year return period event of the location of the location of subsequent reef placement. In a further related embodiment, the initial location for spat bivalve attachment has a significant wave height of a 1 year return period event that is less than ½ of the significant wave height of a 1 year return period event of the location of the location of subsequent reef placement. In a still further related embodiment, the initial location for spat bivalve attachment has a significant wave height of a 1 year return period event that is less than ⅔ of the significant wave height of a 1 year return period event of the location subsequent reef placement.

Example 8

Mass Accumulation

Depending on the initial configuration of the accretion scaffold the biologically accreted scaffold having multiple generations of bivalve growth may have a total mass that is double the original mass of the accretion scaffold or more. In examples in which the original accretion scaffold has a solid structure with few voids such as the concrete ring structure depicted in FIGS. 1-3 of the drawings, the biologically accreted scaffold may have a mass that is at least 150% of that of the original accretion scaffold after bivalve attachment in two separate calendar years upon relocation of the live modular reef. In embodiments in which the original accretion scaffold is in the form of a frame having void spaces the biologically accreted scaffold may have a mass that is at least twice that of the original accretion scaffold after bivalve attachment in two separate calendar years and in many cases would have a mass that is at least four times that of the original accretion scaffold upon relocation of the live modular reef.

While the geometry and mass of the initial accretion scaffold may very significantly, the growth of bivalve organisms on the accretion scaffold will generally impart significant mass to the biologically accreted scaffold. The mass of the biologically accreted scaffold upon relocation for use as a modular reef or as part of a breakwater structure may exceed 400 pounds. In separate related embodiments, the mass of the biologically accreted scaffold upon relocation exceeds 800 pounds and may exceed 1600 pounds.

Example 9

Assembly

Figure 7:
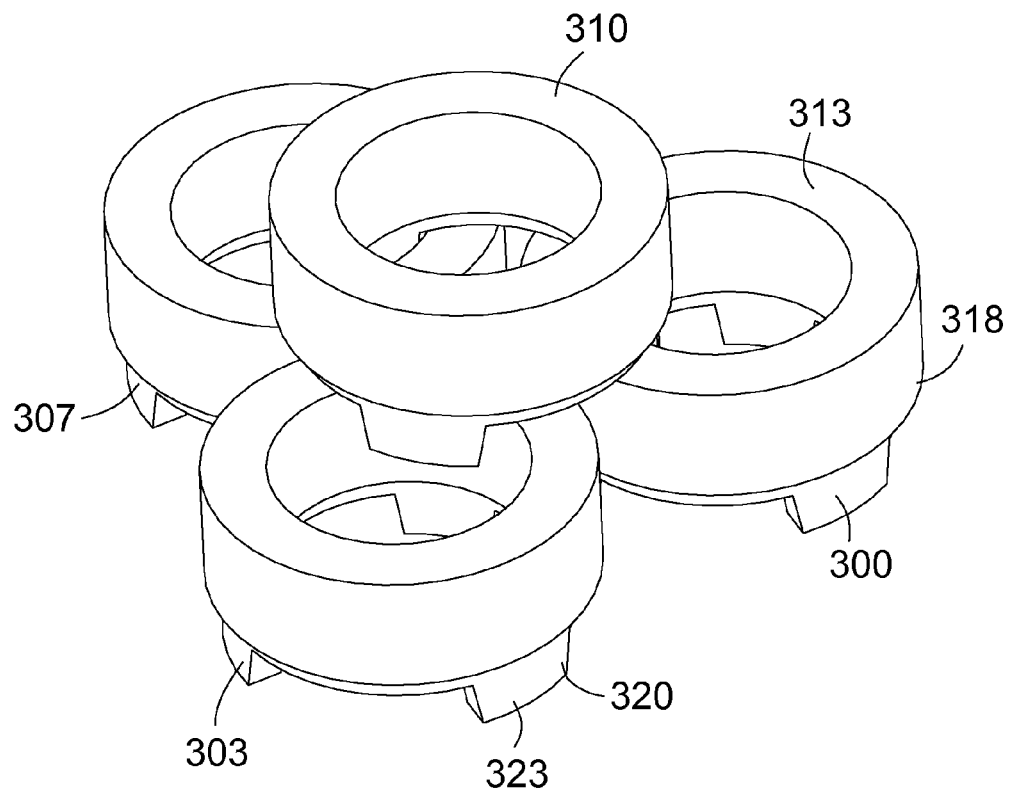
FIG. 7 shows a perspective view several biologically accreted scaffolds assembled as a reef structure.

The biologically accreted scaffolds described herein may be relocated to an area in which they may serve as a breakwater. Referring now to FIG. 7 of the drawings, First biologically accreted scaffold 300, Second biologically accreted scaffold 303, Third biologically accreted scaffold 307, and Fourth biologically accreted scaffold 310 may be arranged in a stacked configuration with or without other biologically accreted scaffolds. The geometric complexity of the growth of the bivalve organisms is not shown in FIG. 7 to reduce the complexity of the drawing. That arrangement may take the form of a line of biologically accreted scaffolds arranged parallel to the shoreline in or near a tidal zone. The biologically accreted scaffolds such as First biologically accreted scaffold 300 may have an Upper biologic accretion layer 313 and an Outer biologic accretion layer 318 which envelop a large fraction of the original accretion scaffold. Depending on the growth pattern and placement of the original accretion scaffolds the biologically accreted scaffolds may have a Non-accreted portion of structure 320. In many cases in which concrete cylinders are used, the biologically accreted scaffolds will have one or more Non-accreted cylinder feet 323. The placement of biologically accreted scaffolds in breakwater or reef structures as described herein may be in a formation that is predominantly made up of biologically accreted scaffolds or it may be in a formation that presents a mixture of biologically accreted scaffolds and other modular reef components that are not living reefs. In many such cases the other modular reef components would be sized comparably to the biologically accreted scaffolds and be significantly larger than the original accretion scaffolds prior to the bivalve growth.

The biologically accreted scaffolds described herein may be used in a variety of marine applications including but not limited to breakwaters, bridge scour protection, groins, and bulkheads. The biologically accreted scaffolds may also be used in marine projects for the enhancement of marine ecosystems.

Example 10

Wave Resilience

The site selection process for the placement of accretion scaffolds and biologically accreted scaffolds in many cases accounts for both the weight of the device being placed and the potential for wave activity at the location of placement. The ability of a biologically accreted scaffold or an accretion scaffold to resist damage or movement by wave action during a one year return period storm event at the location of the device is proportional to $H^3/M_T$ where H is the significant wave height of a 1 year return period event measured in feet and $M_T$ is the total mass of the biologically accreted scaffold in pounds. $H^3/M_T$ has units of $ft^3/lb$. and may be referred to as the total wave risk number. In certain embodiments at the time of initial placement of the accretion scaffold in a marine environment the total wave risk number is less than 1.5 $ft^3/lb$. In a related embodiment at the time of initial placement of the accretion scaffold in a marine environment the total wave risk number is less than 1.0 $ft^3/lb$. In certain embodiments at the time of placement of the biologically accreted scaffold the total wave risk number is less than 1.5 $ft^3/lb$. In certain distinct but related embodiments at the time of placement of the biologically accreted scaffold the total wave risk number is less than 1.0 $ft^3/lb$.

The biogenic contribution to the overall mass of the biologically accreted scaffold may play an important role in the overall ability of the biologically accreted scaffold to resist damage or movement by wave action at the final placement location. The significance of the biogenic contribution may be measured by considering $H^3/M_S$ where H is the significant wave height of a 1 year return period event measured in feet at the location of the biologically accreted scaffold and $M_S$ is the mass of the original accretion scaffold such that $M_S$ does not include any biologically accreted material. $H^3/M_S$ has units of $ft^3/lb$. and may be referred to as the man-made partial wave risk number. After movement of the biologically accreted scaffold to a second location the total wave risk number may be at least 0.2 $ft^3/lb$. lower than the man-made partial wave risk number. In a related embodiment, after movement of the biologically accreted scaffold to a second location the total wave risk number may be at least 0.4 $ft^3/lb$. lower than the man-made partial wave risk number.

Example 11

Mature Geometry

After multiple years of spat bivalve attachment to the accretion scaffold the biologically accreted scaffold may have a geometrically complex surface that is more conducive to further biologic accretion. The surface area of a biologically accreted scaffold may for example be more than twice the original surface area of the accretion scaffold. Another way of characterizing the surface complexity is to measure the distance of the maximum protrusion of biologically accreted material on the accretion scaffold from the original accretion scaffold structure and subtract that maximum protrusion distance from the minimum protrusion distance. In the case where a portion of the original accretion scaffold structure is exposed without bivalve or other growth the minimum protrusion distance would be zero. The difference between the maximum protrusion distance and the minimum protrusion distance is referred to herein as the protrusion variance. The protrusion variance of an accretion scaffold having multiple years of spat bivalve attachment may for example be greater than ½ inch. In a related embodiment, the protrusion variance of an accretion scaffold having multiple years of spat bivalve attachment may for example be greater than one inch. In a further related embodiment, the protrusion variance of an accretion scaffold having multiple years of spat bivalve attachment may for example be greater than 1.5 inches.

Example 12

Size Distribution

As the bivalves grow on the accretion scaffold over the course of more than one calendar year, the generational diversity of the bivalves increases and there is a corresponding increase in the diversity of sizes of bivalves on the biologically accreted scaffold. The size of a bivalve organisms as characterized herein is the measured distance from the hinge to the farthest point on the shell from the hinge. In the case of oyster growth on a biologically accreted scaffold, a measurement in the January following two calendar years of spat attachment may create an oyster population on the biologically accreted scaffold having approximately 30% of the oysters on that biologically accreted scaffold measuring above 1.5 inches and 70% of the oysters on that biologically accreted scaffold measuring 1.5 inches or less. In the case of oyster growth on a biologically accreted scaffold, a measurement in the January following three calendar years of spat attachment may create an oyster population on the biologically accreted scaffold having approximately 15% of the oysters on that biologically accreted scaffold measuring at least 2.5 inches, approximately 30% of the oysters on that biologically accreted scaffold measuring between 1.5 inches and 2.5 inches, and approximately 55% of the oysters on that biologically accreted scaffold measuring 1.5 or fewer inches. Accordingly, for many embodiments, the percentage of bivalve organisms on the biologically accreted scaffold measuring at least 1.5 inches is at least 15% of the total bivalve organism population on the biologically accreted scaffold at any time during the year following the relocation of the biologically accreted scaffold. In a separate but related embodiment, the percentage of bivalve organisms on the biologically accreted scaffold measuring at least 1.5 inches is at least 10% of the total bivalve organisms population on the biologically accreted scaffold at any time during the year following the relocation of the biologically accreted scaffold. In a separate but related embodiment, the percentage of bivalve organisms on the biologically accreted scaffold measuring at least 2.5 inches is at least 8% of the total bivalve organisms population on the biologically accreted scaffold at any time during the year following the relocation of the biologically accreted scaffold. In a separate but related embodiment, the percentage of bivalve organisms on the biologically accreted scaffold measuring at least 2.5 inches is at least 4% of the total bivalve organism population on the biologically accreted scaffold at any time during the year following the relocation of the biologically accreted scaffold.

Example 13

Relative Strength

Regardless of the geometry of the original accretion scaffold, the biologic accretion of bivalve organisms on the scaffold should increase the relative strength of the scaffold. That increase in strength contributes to the resiliency of the structure in cases where the scaffold is ultimately used as a breakwater. The increase in strength of the biologically accreted scaffold over the original accretion scaffold may exceed a 50% increase in strength when evaluating the peak flexural load of a cross-section of the original accretion scaffold versus a cross-section of the biologically accreted scaffold. Evaluations of the increase in strength may be conducted using the methods of ASTM C78 for general guidance as to the methodology of evaluating the increase in strength. In another embodiment the peak flexural load strength of a cross section of the biologically accreted scaffold is at least two times the peak flexural load strength of the original accretion scaffold without any biological accretions.

Example 14

Accretion Scaffold Placement

Salinity may impact the success of the bivalves in both spawning and growing. In certain embodiments, the mean annual salinity of the location of initial placement of the accretion scaffold may be between 7 and 23 g/kg. In certain embodiments, the mean annual salinity of the location of initial placement of the accretion scaffold may be between 8 and 18 g/kg. In certain embodiments, the mean salinity between May 1 and September 30 of the location of initial placement of the accretion scaffold may be between 8 and 40 g/kg. In certain embodiments, the mean salinity between May 1 and September 30 of the location of initial placement of the accretion scaffold may be between 10 and 30 g/kg.

Salinity may also impact the placement of the biologically accreted scaffold. In certain embodiments, the mean annual salinity of the location of placement of the biologically accreted scaffold may be between 7 and 23 g/kg. In certain embodiments, the mean annual salinity of the location of placement of the biologically accreted scaffold may be between 8 and 18 g/kg. In particular, because the biologically accreted scaffold contains a living multigenerational population of bivalve organisms the biologically accreted scaffolds as subsequently placed may survive and continue to grow in final placement locations with lower than ideal salinity. The biologically accreted scaffolds may be relocated to a location that has a mean salinity between May 1 and September 30 of less than 20 g/kg or scaffolds may be relocated to a location that has a mean salinity between May 1 and September 30 of less than 15 g/kg. Further, the biologically accreted scaffolds may be relocated from a first location to a second location where the second location has a mean annual salinity that is at least 1 g/kg lower than the salinity of the first location.

Example 15

Location and Relocation

Accretion scaffolds and biologically accreted scaffolds described herein may be moved, placed, and retrieved by a variety of methods including the use of an excavator or crane on a barge. Slings, hooks, and beams may be used to lift the accretion scaffolds and biologically accreted scaffolds.

Hydraulically operated equipment may also be used to grasp or secure the accretion scaffolds and biologically accreted scaffolds for movement.

Example 16

Growth and Relocation

In one embodiment, a ring structure substantially as depicted in FIG. 1 having a Concrete cylinder outer diameter 123 of 58 inches, a Concrete cylinder thickness 120 of 3 inches and a Total concrete cylinder height 130 of 32 inches is placed in an initial location that has waterborne oyster larva during a portion of the year. The initial weight of the concrete cylinder may be approximately 900 pounds, composed predominantly of Portland cement, and may be characterized as an accretion scaffold. The initial location may have a significant wave height of a 1 year return period event that is 0.8 feet. The initial location may be located 1 foot below mean low water for the initial location. The initial location may have a fetch of 200 yards. The accretion scaffold would be left at the initial location for a period of time sufficient to accumulate three calendar years of spat bivalve attachment. After three separate calendar years of spat bivalve attachment the resulting biologically accreted scaffold may weigh approximately 1900 pounds and would be considered a multi-generational sexually mature modular reef. At that time the biologically accreted scaffold may have a protrusion variance of 2 inches. The biologically accreted scaffold may then be moved to a subsequent location that has an elevation that is 2 feet higher than the initial location and 1 foot above mean low water for the subsequent location. The subsequent location may have a significant wave height of a one year return period event that is 3 feet. The subsequent location may have a fetch that is 800 yards.

As that term is used herein "hard" indicates a hardness sufficient to serve as a suitable location for the attachment of bivalve organisms and includes for example mortar and cement products which have set.

The above-described embodiments have a number of independently useful individual features that have particular utility when used in combination with one another including combinations of features from embodiments described separately. There are, of course, other alternate embodiments which are obvious from the foregoing descriptions of the invention, which are intended to be included within the scope of the invention, as defined by the following claims.

We claim:

1. A method of reef construction comprising:
   a. preparing a scaffold comprising an exposed hard calcium containing material;
   b. exposing the scaffold to a first set of conditions in which a first group of bivalve organisms attach to the scaffold;
   c. allowing the first group of bivalve organisms to grow to sexual maturity such that a group of sexually mature bivalve organisms is present on the scaffold; and
   d. moving the scaffold and the group of sexually mature bivalve organisms from a first location having a first fetch to a second location having a second fetch;
   e. wherein the second location has a feature selected from:
      i. a second fetch that is at least 50% longer than the first fetch and
      ii. a second location that is higher than the first location by an elevation change that is greater than 20% of a distance equivalent to a mean range of tide at the second location;
   f. wherein upon moving the scaffold and the group of sexually mature bivalve organisms to the second location a first fraction of the group of sexually mature bivalve organisms are located above mean low water for the second location.

2. The method of claim 1 wherein the first group of bivalve organisms are oysters.

3. The method of claim 1 wherein a first group of spat bivalve organisms attach to the scaffold during a first calendar year and wherein a second group of spat bivalve organisms attach to the scaffold during a second calendar year.

4. The method of claim 1 wherein the elevation change is greater than 40% of the distance equivalent to the mean range of tide at the second location.

5. The method of claim 1 wherein the second fetch is at least 50% longer than the first fetch.

6. The method of claim 1 wherein the first location is a location that has a significant wave height of a 1 year return period event that is less than 2 feet.

7. The method of claim 1 wherein after bivalve attachment in two separate calendar years the scaffold and the group of sexually mature bivalve organisms have a combined mass that is at least 150% of that of a mass of the scaffold as originally prepared.

8. The method of claim 1 wherein the first location has a significant wave height of a 1 year return period event that is less than ⅔ of a significant wave height of a 1 year return period event of the second location.

9. The method of claim 1 wherein a combined mass of the scaffold and the group of sexually mature bivalve organisms exceeds 400 pounds at the time of moving the scaffold and the group of sexually mature bivalve organisms from the first location to the second location.

10. The method of claim 1 wherein a combined surface area of the scaffold and the group of sexually mature bivalve organisms at the time of moving the scaffold and the group of sexually mature bivalve organisms from the first location to the second location is more than twice a surface area of the scaffold as originally prepared.

11. The method of claim 1 wherein a protrusion variance of the scaffold and the group of sexually mature bivalve organisms is greater than ½ inch.

12. The method of claim 1 wherein at least 15% of bivalve organisms on the scaffold at the time of moving the scaffold and the group of sexually mature bivalve organisms from the first location to the second location measure at least 1.5 inches.

13. The method of claim 1 wherein at least 8% of bivalve organisms on the scaffold at the time of moving the scaffold and the group of sexually mature bivalve organisms from the first location to the second location measure at least 2.5 inches.

14. The method of claim 1 wherein a peak flexural load strength of the scaffold and the group of sexually mature bivalve organisms at the time of moving the scaffold is greater than 150% of a peak flexural load strength of the scaffold as originally prepared.

15. The method of claim 1 wherein a mean annual salinity of the first location is between 8 and 18 g/kg.

16. The method of claim 1 wherein the second location has a mean salinity between May 1 and September 30 of less than 20 g/kg.

17. A method of reef construction comprising:
   a. exposing a man-made scaffold to a first environment such that bivalve organisms grow on the man-made scaffold for a duration sufficient to create a biologically accreted scaffold having two generations of bivalve attachment; and
b. moving the biologically accreted scaffold to a second location;
c. wherein the first environment is a first marine environment;
d. wherein the second location is in a second marine environment;
e. wherein a biologically accreted component of the biologically accreted scaffold makes up at least 30% of a total weight of the biologically accreted scaffold.

18. The method of claim 17 wherein the second location is a location that has a significant wave height of a 1 year return period event that is greater than 1 foot.

19. The method of claim 17 wherein the biologically accreted scaffold contains oysters.

20. The method of claim 17 wherein the second location is above mean low water.

21. The method of claim 17 wherein immediately following the moving of the biologically accreted scaffold to the second location a total wave risk number for the biologically accreted scaffold is less than 1.5 ft$^3$/lb.

22. The method of claim 17 wherein immediately following the moving of the biologically accreted scaffold to the second location a total wave risk number for the biologically accreted scaffold is at least 0.2 ft$^3$/lb. lower than a man-made partial wave risk number for the biologically accreted scaffold.

* * * * *